United States Patent

[11] 3,525,296

[72] Inventor Arvo A. Haapanen
 6601 Trudy Way, Sacramento, California 95831
[21] Appl. No. 748,818
[22] Filed July 30, 1968
[45] Patented Aug. 25, 1970

[54] AIR PRESSURE RELEASE DEVICE FOR AN ENCLOSURE
 10 Claims, 15 Drawing Figs.
[52] U.S. Cl..................................................... 98/2,
 49/171, 98/1
[51] Int. Cl......................................................... F24f 7/00
[50] Field of Search............................................ 98/1, 2;
 49/163, 169, 171

[56] References Cited
UNITED STATES PATENTS
| | | | |
|---|---|---|---|
| 2,573,419 | 10/1951 | Emery........................ | 98/2 |
| 3,392,654 | 7/1968 | Grenier...................... | 98/2 |

Primary Examiner— Meyer Perlin
Attorney— Alexander B. Blair

ABSTRACT: An enclosure, such as an automobile body, walk-in refrigerator and freezer, or the like, is provided with a suitable normally closed vent opening. The sudden closing of a door of such enclosure forces additional air thereinto thereby raising the pressure therein with disadvantageous results. The vent is provided with automatic means, usually electrical means, which is operable when the door is closed to open the vent and thus relieve pressure in the enclosure.

Patented Aug. 25, 1970 3,525,296
Sheet 1 of 3
FIG. 1.
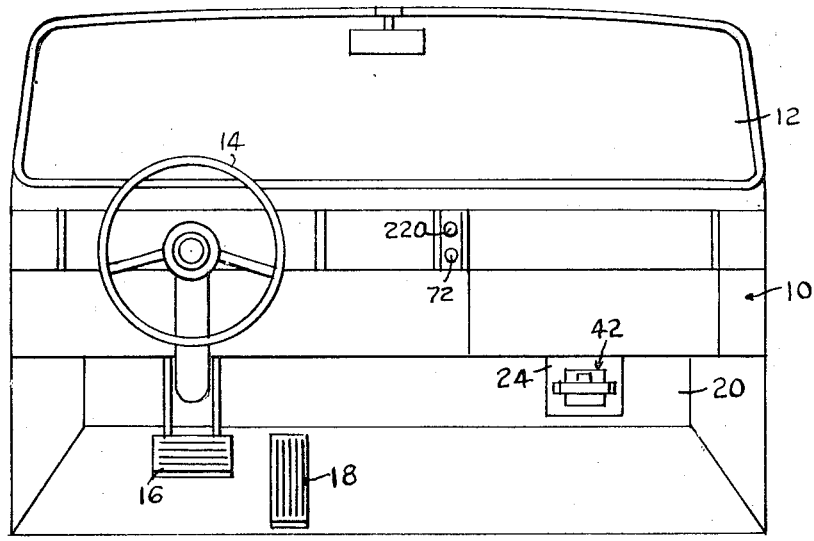
FIG. 2.
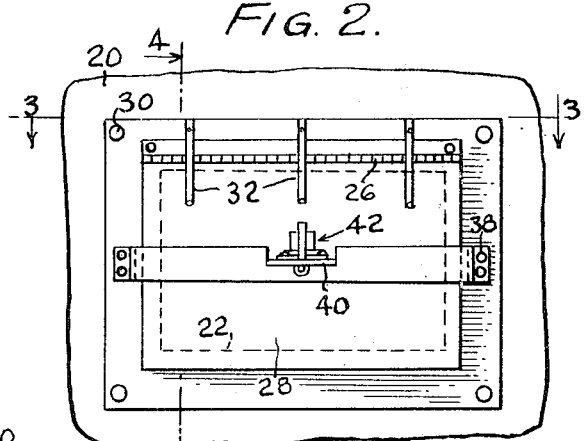
FIG. 4.
FIG. 3.
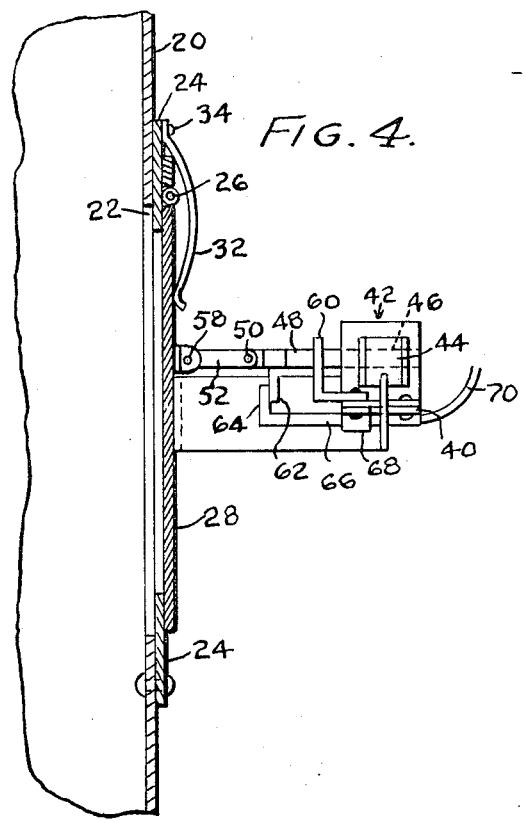
INVENTOR
Arvo A. Haapanen
BY Alexander B. Blair
ATTORNEY Patented Aug. 25, 1970
3,525,296
Sheet 2 of 3
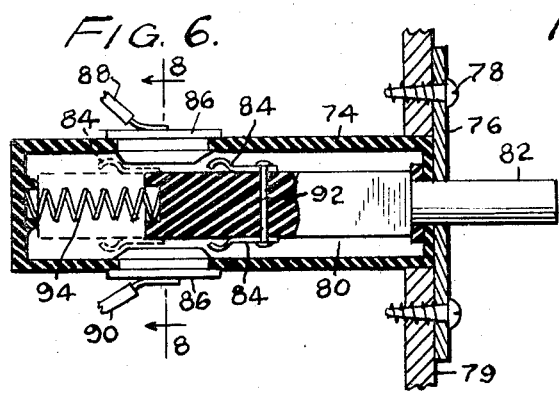
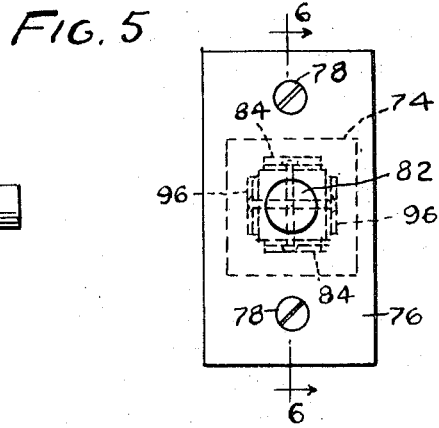
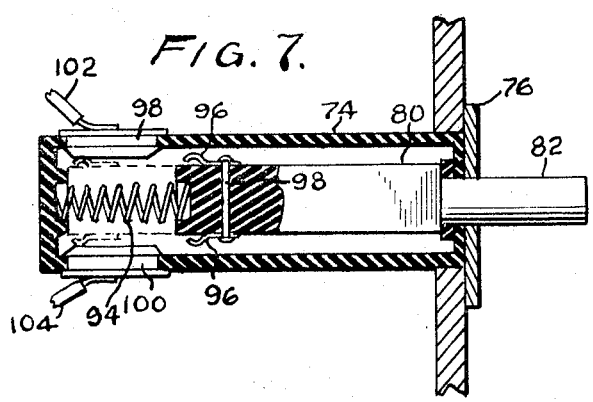
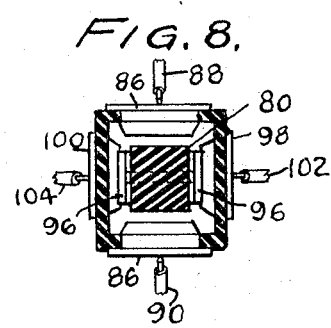
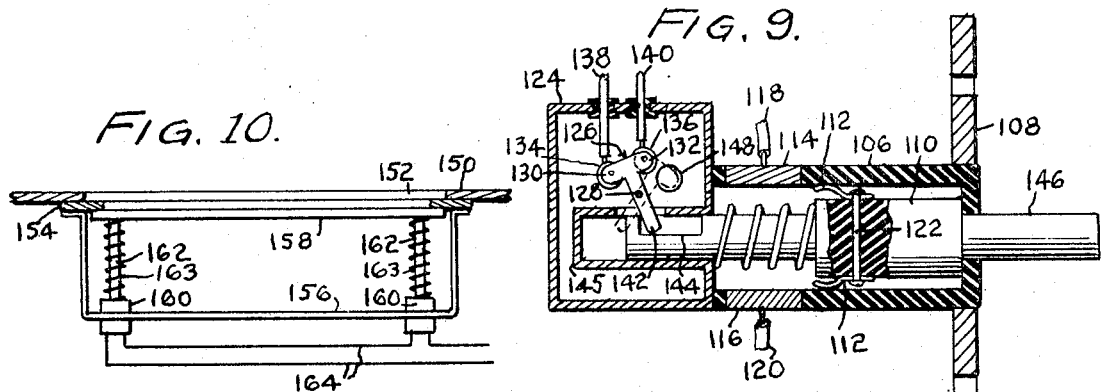
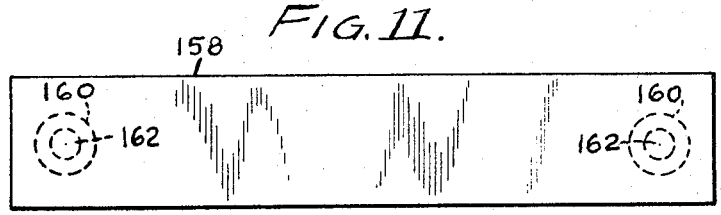
INVENTOR
Arvo A. Haapanen
BY Alexander B. Blair
ATTORNEY

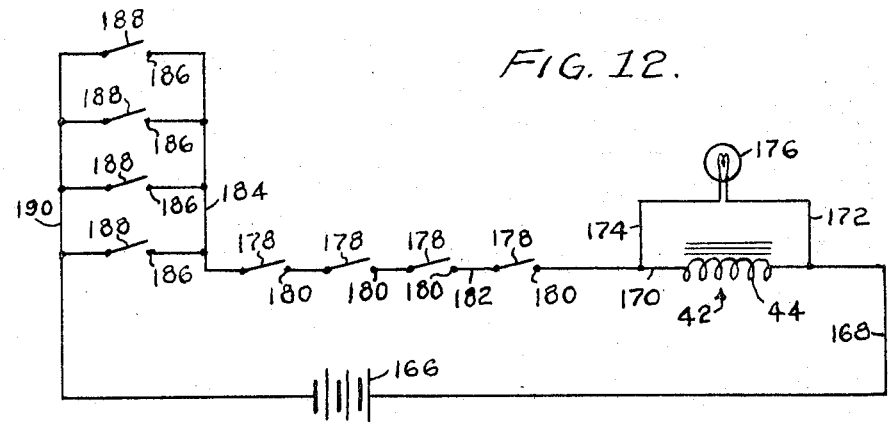
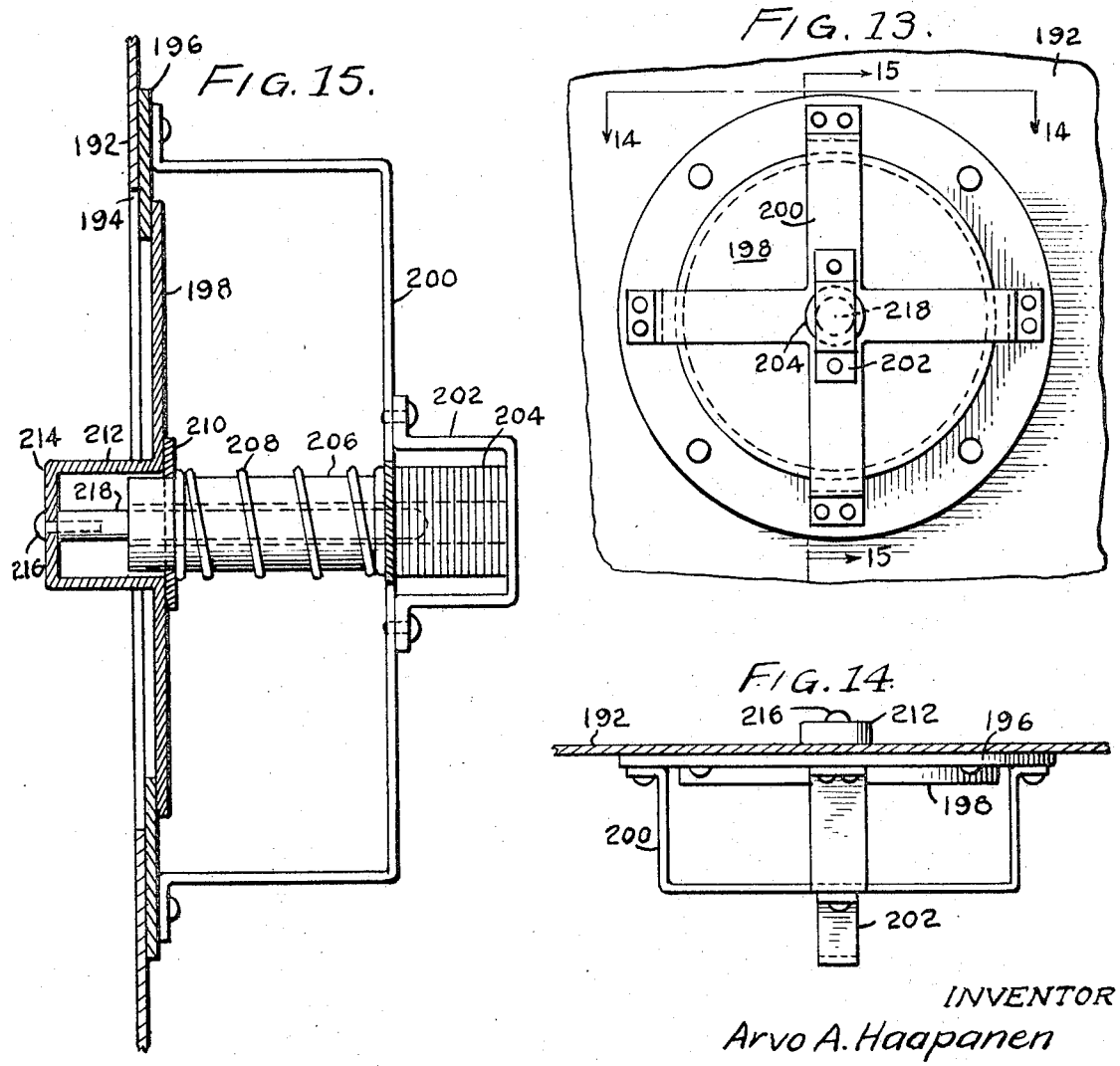
INVENTOR
Arvo A. Haapanen
BY Alexander B. Blair
ATTORNEY

AIR PRESSURE RELEASE DEVICE FOR AN ENCLOSURE

SUMMARY OF THE INVENTION

The device is adapted to be used in conjunction with any enclosure of the general type referred to and is particularly adapted for use with a motor vehicle, the vent of which may be in the floor boards, or the side walls of a truck, or any other suitable point. The vent is normally closed by a door or shutter provided with means, usually electrical, for opening the shutter as the door of the vehicle or other enclosure is moved toward closed position. In the preferred form of the invention, the means for opening the shutter is in the form of a solenoid energizable by means of a switch arranged in the door jamb and adapted to be closed by the door when the latter is closed. The switch is provided with a plunger which projects from the door jamb when the door is open and is actuated by the movement of the door to closed position. The switch is closed prior to the last increment of movement of the door to closed position and the final movement of the door moves the switch to an open position to de-energize the solenoid so that the vent shutter will close.

An electrical system is provided for the solenoid of such nature that only the closing of the last open door of the vehicle will actuate the solenoid thus preventing operation of the vent shutter when one or more doors of the vehicle are open, thus eliminating unnecessary or excessive operation of the solenoid.

BRIEF DESCRIPTION OF THE DRAWINGS

FIG. 1 is a fragmentary showing of the interior of a motor vehicle provided with the device;

FIG. 2 is an enlarged fragmentary view of the vent opening, shutter and associated elements;

FIG. 3 is a detailed sectional view on line 3—3 FIG. 2;

FIG. 4 is a sectional view on line 4—4 of FIG. 2;

FIG. 5 is a face view of a switch and its associated plate fixed to a door jamb of the vehicle or other enclosure;

FIG. 6 is a section on line 6—6 of FIG. 5;

FIG. 7 is a similar view taken at right angles to FIG. 6;

FIG. 8 is a transverse section on line 8—8 of FIG. 6;

FIG. 9 is a view similar to FIG. 6, showing a modified type of door-operated switch;

FIG. 10 is a detailed sectional view of a modified type of vent opening shutter of substantial size so as to require two solenoids for its operation;

FIG. 11 is a face view of the vent shutter of FIG. 10;

FIG. 12 is an electrical diagram for use with the mechanism;

FIG. 13 is a face view of a modified type of vent shutter and operating mechanism;

FIG. 14 is a section on line 14—14 of FIG. 13; and

FIG. 15 is an enlarged section on line 15—15 of FIG. 13.

DESCRIPTION OF THE PREFERRED EMBODIMENTS

The numeral 10 designates the interior of the driver's compartment of a motor vehicle having the usual windshield 12, steering wheel 14, brake pedal 16 and accelerator 18. The fire wall 20 is shown as being provided with a vent opening 22 (FIG. 4) and it will become apparent that this vent opening is not necessarily in the vehicle fire wall but may be at any suitable place where a vent opening of sufficient size may be provided.

A face plate 24 is arranged over and slightly laps vent opening 22 and to such face plate is hinged at 26, the vent opening shutter 28 normally closing the vent opening. The face plate may be secured to the fire wall by screws or other fastening means 30, and the shutter 28 obviously is adapted to swing outwardly at its lower end from the fire wall. Leaf springs 32 are secured at their upper ends as at 34 to the face plate 24 to bias the shutter 28 to the closed position shown in FIG. 4.

A U-shaped frame 36 is fixed at its ends as at 38 to the face plate 24 and carries centrally of the length thereof a support 40 welded or otherwise secured thereto and supporting a solenoid unit 42. This unit comprises a solenoid coil 44 having a sliding armature 46 provided with a rod portion 48 projecting axially therefrom and pivotally connected at one end as at 50 to a link 52 having the other end pivoted as at 58 to the shutter 28.

The rod 48 is slidable in a guide 60 and is provided with a depending arm 62 engaging the upstanding end 64 of an operating rod 66 mounted in a guide 68 secured to a bottom of the base plate 40. The rod 66 is connected by a Bowden wire 70 leading to a pull button 72 on the dashboard of the vehicle. Aside from the electrical operation of the shutter 28, the vent 22 may be opened by pulling on the button 72, as will be apparent.

The solenoid coil 44 is controlled by a switch device shown in FIGS. 5, 6 and 7. This device comprises an elongated casing 74 preferably formed of any suitable dielectric material and preferably square in cross-section, as shown in FIG. 8. This casing 74 is carried by a face plate 76 attached as at 78 to the door jamb 79.

A plunger 80 is mounted in the casing 74 and is provided with an elongated plunger button 82 engageable by the door of the enclosure when the latter is shut to push the member 80 to the left, as viewed in FIGS. 6 and 7. A member 80 is preferably also formed of dielectric material and is provided at opposite sides with switch clips 84 respectively engageable with contacts 86 connected to wires 88 and 90. The clips 84 are electrically connected by a diametric pin 92 extending through the member 80. The plunger 80 is movable to the right by a compression spring 94 which biases the switch elements 84 to open position when the door is open. When the door is closed, the switch elements 84 move across the contacts 86, and the last increment of movement of the door to closed position carries the clips 84 beyond the contacts 86, as shown in dotted lines in FIG. 6.

On the intervening sides of the plunger 80, which is preferably square, as shown in FIGS. 5 and 8, the plunger is provided with contact clips 96 connected through the plunger 80 by a diametrical pin 98. When the door is opened, the clips 96 are dis-engaged from opposite contacts 98 and 100 connected to wires 102 and 104. When the door is fully closed, the clips 96 remain in engagement with contacts 98 and 100, as shown in dotted lines in FIG. 7.

In FIG. 9 a modified form of switch mechanism is shown wherein a casing 106 of dielectric material is carried by a face plate 108 similar to the plate 76 and adapted to be secured to a door jamb. A plunger 110, also preferably of dielectric material, is provided at opposite sides with contact clips 112 movable when the door is closed, into engagement with contacts 114 and 116 connected to wires 118 and 120. The contact clips 112 are connected through the plunger 110 by a diametrical pin 122. This switch device corresponds to the one shown in FIG. 7, the clips 112 remaining in engagement with the contact 114 when the door is completely closed.

At the inner end of the casing 106 is arranged a casing 124 carrying a switch device 126, pivoted to the casing as at 128 and having contact ends 130 and 132 engageable respectively with contacts 134 and 136. These contacts, in turn, are respectively connected to wires 138 and 140, corresponding to wires 88 and 90, previously described. The switch device 126 is provided with an operating end 142 engageable in a slot 144 formed in the inner end of the plunger 110, such end of the plunger being slidable in a portion 145 of the casing 124 to be guided thereby. The switch device occupies the position shown in solid lines shown in FIG. 9 when the door is in open position. The closing of the door pushes axially against an extension 146 of the plunger 110. Under such conditions the contact clips 112 engage the contacts 114 and 116. Near the end of the inward stroke of the plunger 110, the right hand end of the slot 144 engages the arm 142 and moves the contact end 132 into engagement with a dummy contact 148. Thus the circuit across wires 138 and 140 will be broken.

In FIGS. 10 and 11, a modified type of vent opening and operating means therefor is shown, this arrangement being employed in conjunction with a vent opening of a larger area.

The fire wall 150 in FIG. 10 is provided with a vent opening 152 against which is arranged a face plate 154 carrying a U-shaped support 156. In this case the vent closure plate 158 is elongated as clearly shown in FIG. 11, and is movable directly away from the face plate 154 by the energization of solenoids 160, the armatures of which are extended as rods 162 fixed to the shutter 158, which is biased to closed position by springs 163. Suitable wires 164 connect the solenoids 160 in series, although it will be apparent that these solenoids may be connected in parallel.

In FIG. 12 a wiring diagram for the apparatus has been shown. A source of current 166 has one terminal connected by a wire 168 to one terminal of the solenoid 42, the other terminal of the solenoid being connected to one end of a wire 170. Wires 172 and 174 bridge across the wires 168 and 170 and are connected to a light bulb 176 which may be arranged on the dash of the vehicle to indicate when the solenoid 42 is in operation.

Assuming that the vehicle with which this system is used is a four-door sedan, one of the switch devices, such as the one shown in FIGS. 5 to 8, inclusive, is provided for each door of the vehicle. The switches shown in FIG. 7 have been indicated in FIG. 12 by the numeral 178. These switches are provided with contacts 180 to the first of which the wire 170 is connected. The remaining contacts 180 are connected to the associated switches 178 as at 182, and the switch 178 remote from the solenoid is connected to a wire 184. This wire is connected to four contacts 186 engageable by switches 188 which correspond to the switch shown in FIG. 6. These switches are connected to a wire 190 leading back to the terminal of the source 166. Accordingly, it will be apparent that the switches 178 are in series, while the switches 188 are in parallel.

In FIGS. 13, 14 and 15, another modification of a vent shutter and operating means therefor is shown. In this case the fire wall or other wall 192 has a vent opening 194 provided with a face plate 196 engaged under normal conditions by a shutter 198. A support 200 is provided with a bracket 202 supporting a solenoid 204, and a cylindrical guide 206 is connected to the center of the support 200. A spring 208 surrounds the guide 206 and engages at its ends respectively with the center of the support 200 and with a plate 210 engaging against the shutter 198. This shutter is provided with an axial cylindrical extension 212 closed at its ends as at 214 and connected as at 216 to the armature 218 of the solenoid 204. When the solenoid 204 is energized, the armature 218 moves to the right imparting opening movement to the shutter 198 against the tension of the spring 208.

OPERATION

When any one door of the vehicle, if the apparatus is used on a sedan, is opened, the push button plunger 82 (FIGS. 6 and 7) will be in the extended position shown, in which case both sets of contact clips 84 and 96 (corresponding to switches 188 and 178, respectively, in FIG. 12) will be in the open solid-line positions shown in FIGS. 6 and 7. Assuming that only one door is opened, the closing of this door will move the plunger 80 to the left in FIGS. 6 and 7, closing both switches. In FIG. 12 only one of the switches 178 and 188 will be in open position when the door is open and when the door is closed, both of the switches will be closed. The switch elements 96 in the closed-door position will remain in engagement with the contacts 98 and 100, and accordingly the single previously opened switch 178 (FIG. 12) will now be closed, as is true of the remaining switches 178 since only one door will have been opened.

As the door moves towards closed position a circuit will have been completed through all of the series switches 178 and through the single switch 188 of the door being closed. The light 176 will be illuminated, indicating that the solenoid 42 is operating. If the door is closed rapidly, there can be an appreciable build-up of pressure in the vehicle causing discomfort to occupants in the vehicle. Some people have ear-drums which are particularly sensitive to this increase in pressure.

As previously stated, only the switch 188 of the previously opened door will be closed as the door is closed. Thus, the solenoid will be operated to pull on the link 52 (FIG. 4) to open the shutter 28 and thus vent the interior of the vehicle of other compartment to the atmosphere and preventing a building up of pressure. As the door partakes of its last increment of movement to its fully closed position, the contacts 84 will move beyond the contacts 86, as shown in dotted lines in FIG. 6. Thus the single closed switch 188 (FIG. 12) will now be opened to correspond to the position of the remaining switches 188, and accordingly the circuit through the solenoid will be broken.

The switches 178 are not wholly essential to the apparatus but their use is preferred so that only the last open door of the vehicle will operate the solenoid 42 when closed. It will be apparent that the function of either switch 188 (FIG. 12) is dependent upon all of the switches 178 being closed, since they are in series. Thus, if more than one vehicle door is opened and one such door is closed, the continuous circuit through the swtiches 178 will not be closed. When only one door remains open, the remaining associated switches 178 will be closed and the single remaining switch 178 of the only door now remaining open will close the circuit through the associated switch 188 to operate the solenoid, as stated.

The switch of FIG. 9 may be used in place of the switch in FIGS. 5 to 8, inclusive, and is advantageous thereover for a reason which will be described. In the previously described form of the invention, the switch plunger 80 is arranged in the normal position indicated by dotted lines in FIGS. 6 and 7 with the door closed. Upon initial opening movement of any one door, the switch contacts 84 will be closed and the contacts 96 (FIG. 7) will also be closed. All of the switches 178 (FIG. 12) will be closed and one of the switches 188 will be closed through engagement of one set of contacts 84 with the stationary contacts 86 (FIG. 6) of the door being opened. Hence the solenoid 44 will be energized until the contacts 84 leave the contacts 86 when the door is substantially fully opened, at which time the solenoid circuit will be opened.

With the switch device in FIG. 9, the opening movement of one door will not energize the solenoid. When all of the doors are closed, the switch elements 130 and 132 will be in the dummy position shown in dotted lines in FIG. 9. The switch fingers 112 will be in engagement with the respective contacts 114 and 116, and this being true of all of the door switches, all of the switches 178 (FIG. 12) will be closed and all of the switches 188 will be opened. Since the switch device 126 will remain in the dummy position during opening movement of the door, all of the switches 188 will be open, and accordingly the solenoid circuit will not be closed. As a door approaches a fully open position, the switch fingers 112 will move out of engagement with their contacts and the last increment of movement of the door to open position will swing the switch device 126 to the solid line position in FIG. 9, thus closing one of the switches 88 (FIG. 12). This does not occur however until the switch fingers 112 leave their stationary contacts and under such conditions the corresponding switch 178 will be open. Thus, the solenoid circuit will not be closed during opening movement of any door.

When the door is closed, movement of the plunger 110 (FIG. 9) to the left moves the switch fingers 112 into engagement with their stationary contacts. Since this closes one of the switches 178 while the remaining switches 178 will be normally closed, and since the switch device 126 of the door now being closed is in operative position, the solenoid circuit will be closed. As the door approaches closed position, the right hand end of slot 144 will swing the switch device 126 to the dummy position shown in dotted lines, thus opening the previously closed switch 188. Thus, the solenoid circuit will be opened as the door approaches fully closed position. As in the case of the switch device in FIGS. 6 and 7, the device in FIG. 9 will operate to energize the solenoid circuit only upon the closing of the last door when two or more of the doors of the vehicle have been opened.

The device shown in FIGS. 10 and 11 is preferred when a relatively large vent is desired. In this case, the two solenoids 160 will be simultaneously operated when the switches 178 (FIG. 12) and one of the switches 188 is closed. The solenoids 160 will directly pull the shutter 158 to open position, and either of the switch devices 188 will break the circuits of the solenoids 160 as the door reaches closed position.

The operation of the device shown in FIGS. 13—15 will be apparent. The solenoid 204 is substituted for the solenoid 42 and is energized in the same manner to exert a pull on the armature 218 to move the shutter 198 linearly to the right in FIG. 15 to open position. Here again, the use of either of the switch devices will break the solenoid circuit when the previously opened door reaches the final increment of movement to closed position.

While the mechanism has been described as being operable upon operation of a solenoid or through manual operation of a Bowden wire by pulling the button 72, it will be apparent that a suitable electrical circuit overruling the circuit in FIG. 12 may be provided and may include an operating switch button 220 (FIG. 1). This circuit forms per se no part of the invention and may simply shunt across wires 170 and 190 in FIG. 12 to maintain the solenoid energized, thus maintaining the vent opening shutter in open position.

In the case of small passenger vehicles and the cabs of heavy trucks and tractors, these enclosures are fairly airtight and the closing of a door builds up air pressure in the cab or vehicle as the door approaches closed position, thus requiring the slamming of the door. The releasing of the air pressure by the present mechanism reduces the force necessary in closing the door of the vehicle or other enclosure. Moreover, some people's ear drums are sensitive to sudden increases in pressure which normally occur upon the closing of the last door of the vehicle. This increase in pressure is prevented by the present device.

From the foregoing it will now be seen that there is herein provided an improved air pressure release device for an enclosure which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. In combination, a substantially air-tight enclosure including walls having doors and vent openings formed therein, a closure means normally closing said vent opening and movable to an open position, said closure means being biased to closed position, power means for moving said closure means to open position, and control means operable by movement of a door to closed position in said door opening for energizing said power means to open said closure means and then release said power means for movement of said closure means to closed position as the door reaches fully closed position.

2. The combination defined in claim 1 wherein said power means is a solenoid, said control means being a switch adjacent said door opening operable by the closing of the door.

3. The combination defined in claim 2 wherein said switch is provided with a stationary contact and a contact movable by the door over said stationary contact, final movement of the door to closed position moving said movable contact past said stationary contact to break the circuit through said solenoid and release said closure means for movement to closed position.

4. The combination defined in claim 2 wherein said control means comprises an elongated casing fixedly mounted adjacent the door opening and provided in one wall thereof with a stationary contact, a plunger movable longitudinally in said casing and having a projecting end engageable by a door mounted in said door opening, a movable contact carried by said plunger and disengaged from said stationary contact when said door is opened, the distance of movement of said plunger being greater than the length of said stationary contact longitudinally of said casing whereby initial movement of the door to closed position engages said movable contact with said stationary contact, and whereby said movable contact, during the last increment of movement of the door to closed position, moves beyond said stationary contact to de-energize said solenoid to release said closure means for movement to closed position.

5. The combination defined in claim 2 wherein said closure means is pivoted along one edge, said solenoid having an armature mechanically connected to the opposite edge of said closure means to swing the latter to open position, and at least one leaf spring having one end fixed to the adjacent wall of the enclosure and having its opposite end engaging said closure means at a point spaced from the pivot axis thereof whereby, when said solenoid is de-energized, said leaf spring moves said closure means to closed position.

6. The combination defined in claim 2 wherein said closure means is bodily movable away from said vent opening, said power means comprising a solenoid the armature of which is rigidly connected to said closure means to move it directly away from said vent opening when said solenoid is energized.

7. The combination defined in claim 1 wherein the enclosure is provided with a plurality of door openings each provided with one of said control means, any of which will operate said power means, and means for preventing operation of any of said control means except upon movement of the last door to closed position.

8. The combination defined in claim 1 wherein said enclosure is provided with a plurality of door openings each having one of said control means associated therewith, said power means comprising a solenoid mechanically connected to said closure means to open it upon energization of said solenoid, each of said control means comprising a switch device having a stationary contact and a movable contact arranged to be actuated by the associated door upon closing movement thereof, each movable contact being disengaged from its associated stationary contact when the associated door is open and movable beyond and out of engagement with the stationary contact upon the last increment of movement of the door to closed position.

9. The combination defined in claim 8 wherein each control means is provided with a second switch device all of which are connected in series with said first-named switch device, each of said second switch devices being open when the associated door is opened, whereby, when a plurality of doors are in open position, the closing of said doors sequentially will not operate said first-named switch device until the last of said doors is closed to close the circuit through said series-connected second switch devices.

10. The combination defined in claim 9 wherein said first-named switch devices are connected in parallel and in series with said second switch devices whereby, when one of said first-named switch devices is open and the remaining ones closed, the open first-named switch device upon closing thereof together with the closing of the corresponding second named series-connected switch will close the circuit through said solenoid.